(12) United States Patent
Higby et al.

(10) Patent No.: US 6,264,845 B1
(45) Date of Patent: *Jul. 24, 2001

(54) AUGMENTED ELECTROLYTIC PRECIPITATION OF METALS, METHOD AND APPARATUS

(75) Inventors: Loren P. Higby; Travis P. Higby, both of Sandy, UT (US)

(73) Assignee: Watermark Technologies, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/388,305

(22) Filed: Sep. 1, 1999

Related U.S. Application Data

(63) Continuation of application No. PCT/US98/18406, filed on Sep. 2, 1998.

(51) Int. Cl.[7] ............................................. C02F 1/46
(52) U.S. Cl. ........................ 210/748; 210/911; 205/742; 205/761
(58) Field of Search ................................. 210/748, 911; 205/742, 761

(56) References Cited

U.S. PATENT DOCUMENTS

| | | | |
|---|---|---|---|
| 3,926,753 | 12/1975 | Lee | 204/149 |
| 3,989,608 | 11/1976 | DeMonbrun et al. | 204/149 |
| 4,011,151 | 3/1977 | Ito et al. | 204/149 |
| 4,596,641 | 6/1986 | Bridger et al. | 204/151 |
| 4,675,085 | 6/1987 | Vasquez | 204/105 |
| 4,692,228 | 9/1987 | Twardowski | 204/105 |
| 4,792,385 | 12/1988 | Snyder et al. | 204/140 |
| 5,690,806 | 11/1997 | Sunderland et al. | 205/560 |

*Primary Examiner*—David A. Simmons
*Assistant Examiner*—Betsey Morrison Hoey
(74) *Attorney, Agent, or Firm*—Kirton & McConkie; Michael F. Krieger

(57) ABSTRACT

The invention is directed to a method and pressurized apparatus for removing anions and cations of transition and post-transition metals from aqueous solutions comprising a continuous flow electrolytic cell. Also a method for determining the amount of arsenic in each of its states present in a solution and a method of creating iron III hydroxide, aluminum hydroxide, and manganese dioxide for use as filter or adsorption media.

24 Claims, 8 Drawing Sheets

AUGMENTED ELECTROLYTIC PRECIPITATION OF METALS, METHOD AND APPARATUS

PRIORITY INFORMATION

This application is a continuation of PCT application Ser. No. PCT/US98/18406, filed Sep. 2, 1998.

BACKGROUND OF THE INVENTION

The Field of the Invention

The present invention relates generally to the field of treatment of aqueous solutions including domestic water, surface waters and wastewater using electrolytic means. More specifically, this invention relates to the area of electrolytic chemistry wherein anions and transition metal and post-transition metal cations are removed from aqueous solutions. More particularly, the present invention is directed to methods of augmenting the electrolytic chemistry by introducing nonambient environmental and electrical potential, stresses and influences.

One example of the application of the present invention is the removal of arsenic from potable water or waste water. Arsenic is a well known poison, indeed nearly all compounds containing arsenic are toxic. The presence of even small amounts of arsenic in potable water and slightly higher amounts in wastewater cannot be tolerated. The electrolytic method and apparatus of the present invention can efficiently and cost effectively remove arsenic from aqueous solutions down to a nearly imperceptible trace. The present invention can also be used to remove other contaminants, such as iron, from such solutions to render the water more potable and more palatable.

The Relevant Technology

Various removal methods of heavy metal ions from aqueous solutions are known.

For example, Bouard et al., U.S. Pat. No. 5,425,857 discloses a process and device for the electrolytic generation of arsine.

Brewster, U.S. Pat. No. 5,368,703 discloses a multi-step process and apparatus for removing arsenic from aqueous media. The process utilizes ferrous +2 ions provided by an electrolytic cell in which the +2 ions are added to the aqueous media in a first step. A second step comprises oxidizing conditions generated by the addition of hydrogen peroxide (Fentons Reagent). In the second step, the ferrous +2 ions react with the components of the hydrogen peroxide to form a hydroxide that is oxidized to an oxyferric oxide. Under these conditions, a third reaction occurs in which the arsenic present at a +3 oxidation state is oxidized to a +5 oxidation state. Thereafter, a forth reaction forms a precipitate by which the arsenic oxyacid is adsorbed to the hydroxy ferric oxide and precipitated out.

O'Connor et al., U.S. Pat. No. 5,182,023, discloses a process for treating arsenic-containing aqueous waste using ultra filters to remove solids. It is followed by a chemical treatment to adjust the pH range from about 6 to 8. Then, antiscalents and antifouling material are added. The chemically treated filtrate is then subjected to a reverse osmosis process to result in a permeate stream having less than about 50 parts per billion arsenic.

Gallup, U.S. Pat. No. 5,024,769 discloses a method of treating an aqueous solution containing one or more arsenic compounds in a +3 oxidation state. The method comprises contacting the aqueous solution with a halogenated organic oxidizing agent to convert the +3 arsenic to a +5 oxidation state.

McClintock, U.S. Pat. No. 5,358,643 discloses a treatment method for removing arsenic from water via conditioning the water with one or more additives including an iron salt, an acid, and an oxidant until the water contains more iron than arsenic, is acidic, and has an oxidation-reduction potential of about plus 600 mV. A reagent is then added to the conditioned water until it becomes basic and the water and additives are then reacted in a reaction chamber wherein iron and arsenic are co-precipitated in the form of iron arsenate and iron hydroxide or iron oxide. The treated water is then separated from the precipitate by settling or filtering.

In the article entitled "Use of Electrochemical Iron Generation for Removing Heavy Metals from Contaminated Groundwater" by M. D. Brewster and R. J. Passmore published in the *Environmental Progress* (Vol. 13, No 2) May, 1994 at page 143, the authors discuss an electrochemical iron addition process developed by Andco Environmental Processes, Inc. The process employs electric current and steel electrodes to put ferrous and hydroxyl ions into solution. Once added, the chemistry is manipulated with the addition of various ions to provide coprecipitation and adsorption conditions capable of simultaneously removing a wide variety of heavy metals. For example, hydrogen peroxide was introduced to convert $Fe+2$ to $Fe+3$, and arsenite to arsenate. The pH was then adjusted to precipitate and adsorb various heavy metal oxides.

What is needed is a more direct method of precipitating out heavy metals without the necessity of multiple steps, reagents and reactions. These needs could be met by a continuous processing method or flow-through method and a static batch process to remove ions from an aqueous solution by constructing an electrolytic cell with a transition metal or post-transition metal anode and a transition metal, post-transition metal or graphite cathode to electrolytically and directly precipitate out the desired ionic specie for physical removal of the precipitates from the aqueous solution.

SUMMARY AND OBJECTS OF THE INVENTION

The present invention provides methods and apparatus to enhance and augment the efficient removal of anions and transition metal and post-transition metal cations from aqueous solutions. The present invention directly produces a precipitate comprising an adion and an in-migrated anion. The method alleviates the need for multiple steps, additional reagents and the removal problems associated with the prior art devices and methods. Use of the devices and methods of the present invention also reduce the ion concentration left in the treated aqueous solution to significantly less than the prior art methods. Some examples are the removal of arsenic at both the +5 and the +3 oxidation state and the removal of iron.

The present invention also provides a method for determining the amounts of arsenic present in a solution in its trivalent, pentavalent and particulate forms. The present invention also provides a method of producing Iron III hydroxide, aluminum hydroxide and manganese dioxide which can be used as filter media or adsorption media.

The methods of the present invention may employ a batch process or a flow-through process. In the batch process, electrodes contact the solution in a static container wherein a fixed amount of aqueous solution is treated. This method is most appropriate for treating small amounts of solution and for analysis such as the speciation technique of the present invention as described below.

In the flow-through process, a flow of aqueous solution, such as a domestic water supply, is allowed to flow through an electrolytic cell of the present invention wherein the desired contaminants are precipitated to an insoluble form to be removed from the solution downstream by known filtration, settlement or other means.

Whether the process is employed in batch or flow-through, direct precipitation is enhanced by subjecting the process to increased pressure, increased electrical potential, increased flow rate and decreased temperature. Increased pressure is believed to better organize the solvent molecules and to better disorganize the solutes (cations and anions). This allows for an enhanced migration velocity of ions towards their respective electrodes. Increased voltage potential is believed to better control the amount of available iron ion going into solution. Increased flow rate acts to convect away from the surface of anode unwanted anions that would discharge electrons causing undesirable side reactions. Decreased temperature is believed to lessen the mobility of solvent molecules, which when very mobile react at the electrodes, in great abundance, to produce unwanted by-products. These nonambient conditions augment the removal of the target minerals or compounds.

An object of the present invention is to provide an entirely electrolytic method for the treatment of aqueous solutions contaminated with anions and transition metal and post-transition metal cations, a primary example being arsenic. This is accomplished utilizing an electrolytic cell, preferably flow-through, but also static. Regardless of the type of cell used, the voltage source, acting as an external electron moving force, creates electrostatic forces in and around the charged electrodes which act to more controllably and selectively attract desired anions and cations to their respective poles for precipitation followed by physical separation.

When aqueous solutions with neutral pH, such as drinking waters, are subjected to the electrolytic method of the present invention, ionic substances are attracted to and travel toward oppositely charged electrodes by several modes including: convection, diffusion, and migration, or a combination thereof. The pronounced efficiency and simplicity of the present invention is believed to be due to its ability to optimize the effects and reaction environment of these ionic transportation pathways without necessarily manipulating the pH of the bulk solution. However, it has been discovered that the efficiency of the present invention is enhanced under conditions of increased pressure, electrical potential, and decreased temperature.

By employing the present invention, the removal of undesirable soluble ionic species by direct precipitation can be enhanced within or near the diffusion layer of the anode or cathode without an additional oxidation reaction or reagent. Cationic species can be removed from an aqueous solution having a somewhat neutral pH. A cathode having sufficient potential creates an adsorbed alkaline layer on its surface. This adsorbed alkaline layer of the cathode consists of newly created hydroxyl ions generated from solvent water molecules gaining additional electrons at the cathode surface. Immediately adjacent to the alkaline layer and on the solution side of the cathode an acid layer will form consisting of in-migrated cations. Together the two layers constitute the "Hemholtz Double-Layer" of the cathode. When alkaline, transition or post-transition metals enter the alkaline layer they react to form insoluble oxide precipitates and are removed from the solutions total dissolved solids. Using zinc cations, a primary example of this reaction is as follows:

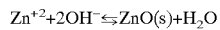

$$Zn^{+2}+2OH^- \leftrightarrows ZnO(s)+H_2O$$

Within strongly alkaline aqueous systems zinc cations form zinc oxides rather than zinc hydroxides. Similarly, the following examples are also given:

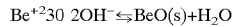

$$Be^{+2} 3O\ 2OH^- \leftrightarrows BeO(s)+H_2O$$

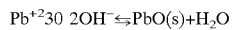

$$Pb^{+2} 3O\ 2OH^- \leftrightarrows PbO(s)+H_2O$$

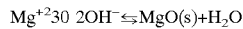

$$Mg^{+2} 3O\ 2OH^- \leftrightarrows MgO(s)+H_2O$$

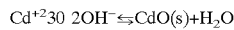

$$Cd^{+2} 3O\ 2OH^- \leftrightarrows CdO(s)+H_2O$$

Anionic species can also be removed from an aqueous system having a somewhat neutral pH by the deliberate corrosion of a transition metal or post-transition metal anode thereby effectively colliding and bonding anode emitted metal cations with in-migrating anions resulting in a direct precipitation within the diffusion layer of the corroding anode. Superior results can be achieved when, unlike the prior art, pressure, enhanced potential and current is applied to the anode and when the anode is of the appropriate material such that the anode will corrode continuously until it is spent and the cathode is of such construction to allow an enlarged adsorbed alkaline layer on its surface to reside.

This corrosion process forms an adsorbed acid layer on the surface of the anode. This adsorbed acid layer is known in the art as one of the two layers comprising the "Anodic Hemholtz Double Layer." This layer is blanketed on the solution side by an alkaline layer. Between the two layers, bulk solution neutrality is maintained. In the case of an iron anode, this acidic layer consists of adsorbed $Fe^{+3}$ cations. Adsorbed cations are referred to as adions. As the targeted anions of the neutral solution migrate toward the anode, the targeted anions enter this adsorbed acid layer wherein they directly coordinate with the $Fe^{+3}$ ions and form precipitates.

When solutions containing inorganic arsenic are treated with an iron anode, two chemical reactions leading to precipitation of arsenic have been observed to occur simultaneously. The first and most direct is the simple complexation of iron III cations with the completely oxidized complex anions of arsenic. The resulting anodic product being iron III arsenate according to the following reaction:

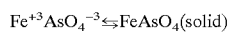

$$Fe^{+3}AsO_4^{-3} \leftrightarrows FeAsO_4(solid)$$

A second, yet simultaneous and more complex chemical pathway involves oxidation of $As^{+3}$ to $As^{+5}$ via oxidation by the anodic emitted $Fe^{+3}$ cations. Followed by the simple complexation chemical pathway involving additional $Fe^{+3}$ cations to produce the anodic product of iron III arsenate:

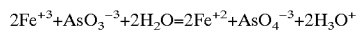

$$2Fe^{+3}+AsO_3^{-3}+2H_2O=2Fe^{+2}+AsO_4^{-3}+2H_3O^+$$

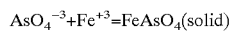

$$AsO_4^{-3}+Fe^{+3}=FeAsO_4(solid)$$

Both chemical pathways alleviate the need for multiple step processes, manipulating pH or requiring the use of additional, chemical reagents. Using the method of the present invention, neutral drinking water containing 50 parts per billion inorganic arsenic can be treated. The contaminated drinking water was passed through an electrolytic cell having an external electron moving force. Cell potential was 10 eV with a cell current of 10 amps. The anode and cathode were made of iron separated by a distance of 4.5 mm. The pressure of the system was at least 10 psi. Subsequent graphite furnace atomic absorption (GFAA) analyses of the treated water revealed that the arsenic levels were less than 1 parts per billion. Testing for solubilized iron content revealed a concentration less than 10 parts per billion.

This method of the present invention can be applied to anodes composed of transition metals and post-transition metals as defined in the standard periodic table of the elements. Anodes composed of aluminum, copper, iron, lead, zinc, tin, manganese, nickel, silver and cobalt have been successfully tested by removing one or more of the following anions from aqueous solutions: $TiO_3^{-2}$, $VO_3^{-2}$, $MoO_4^{-2}$, $SbO_4^{-3}$, $AsO_4^{-3}$, $AsO_3^{-3}$, $SeO_4^{-2}$, $SeO_3^{-2}$, $S^{-2}$, and $PO_4^{-3}$ The present invention reveals that the best mode for treating neutral drinking water containing arsenic is to employ the electrolytic cell of the present invention, utilizing an iron anode with a cell potential sufficient to cause complete oxidation of the anodic adsorbed iron III cations (Fe+3). The anode emitted iron III cations ($Fe^{+3}$) react directly with the in-migrating arsenic complex anions to form the insoluble precipitate of iron III arsenate or to oxidize the in-migrating arsenite complex anions to arsenate to form the insoluble precipitate of iron III arsenate. Thereafter, the insoluble precipitate is filtered out using known filtration methods or apparatus.

Unlike the prior art, the method of the present invention utilizing an iron anode can directly remediate anionic arsenic compounds from aqueous systems with an optimal pH range of 5 to 9. The resulting anodic products of iron III arsenate and iron III hydroxide are of a finely divided and suspended solid form in the treated aqueous system. Separation of these solids is accomplished via coagulation or filtration and disposed of according to the toxicity leach characteristics of the resulting sludge, leaving purified water effluent.

The method of the present invention thus provides a continuous electrolytic processing method to remove anions, transition metal cations and post-transition metal cations including arsenic from neutral drinking waters by the use of a novel electrolytic cell without further treatment such as the addition of oxidation reagents, without multiple intermediate reactions, and without manipulating pH beyond the diffusion layer.

Due to the arrangement of anodes and cathodes employing the present invention, and due to the nature of the precipitates formed, the corroding anode(s) and cathode(s) can be relieved of buildup from the continuous corrosion/deposition process by reversing the electrical potential. In this way, an acid diffusion layer becomes basic and a basic diffusion layer becomes acidic, thereby sloughing off any buildup of precipitate. This anti-fouling technique permits cleaning of the electrodes for more efficient reaction.

Precipitates and other particulate matter are often removed from the aqueous solution using a filtration process. When small particles must be removed with a filter, it may become necessary to use filter media. These media are small particles which build up on a filter surface thereby decreasing the effective size of the filter openings and allowing the entrapment of smaller particles. Precipitates may also take the role of adsorption media. Adsorption media are particles which provide active adsorption sites for unwanted solubilized contaminants which might otherwise remain in a dissolved state thereby allowing them to be removed by filtration or settling.

An object of the present invention is to provide a method and apparatus for removing anions and transition metal and post-transition metal cations from aqueous solutions without the addition of chemicals for oxidation of the solution, without intermediate process steps, without the adjustment of overall solution pH.

It is a further object of the present invention to provide a method and apparatus to augment the removal of anions and transition metal and post-transition metal cations from aqueous solutions by stressing and controlling the reaction environment and wherein the solution may be treated in a substantially continuous flow without interruption of the flow of the solution to its final destination.

Another object of the present invention is to provide a method and apparatus for removing anions and transition metal and post-transition metal cations from aqueous solutions that does not require downtime for maintenance of the electrodes to prevent them from fouling due to accumulation of precipitates on the surface of the electrodes.

Still another object of the present invention is to provide a method and apparatus for removing precipitate buildup off anodes and cathodes without down time of the electrolytic cell.

It is a further object of the present invention to provide a method and apparatus for removing anions and transition metal and post-transition metal cations from aqueous solutions in a way that will allow identification of the quantity of various species of ions present in the solution. This method and apparatus more specifically identifies the amount of dissolved arsenic at the +5 oxidation state, the amount of dissolved arsenic at the +3 oxidation state and the amount of particulate arsenic present in a sample of a given solution. This method and apparatus are useful in determining what treatment process will be necessary or most effective in removing arsenic from a specific source.

It is an object of the present invention is to provide a means to create filter and adsorption media for the removal of contaminants from aqueous solutions.

Other objects and advantages of the present invention will be apparent from the following detailed description.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

Figure 1:
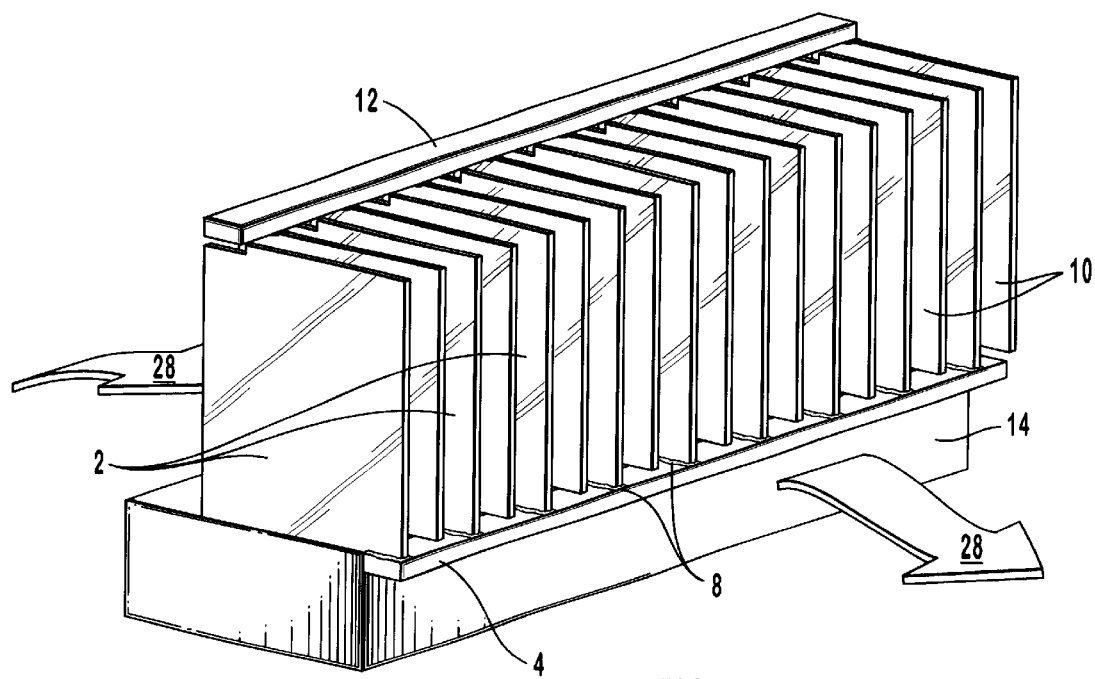
FIG. 1 is a perspective view of the preferred embodiment of a typical electrolytic cell used for the flow-through or continuous flow apparatus.

Including, by express reference, the figures listed above as part of this detailed description.

The methods of the present invention may be performed using either the continuous flow apparatus or a batch method apparatus as described below.

CONTINUOUS FLOW OR FLOW-THROUGH METHOD APPARATUS

The apparatus for the continuous flow or flow-through method of the present invention allows a stream of solution to flow uninterrupted to its destination while being treated.

The solution to be treated may be directed through the electrolytic cell by several means under conditions such that the pressure of the solution need not necessarily be increased significantly above ambient pressure. However, it has been discovered that utilizing an apparatus providing conditions of increased pressure, electrical potential and decreased temperature, the reaction rate, efficiency and result are enhanced.

The preferred embodiment of the continuous flow apparatus may best be described by reference to FIGS. 1 through 4 in which the anode 2 and cathode 10 take the form of plates. Each anodic plate is welded 8 to an anode bus bar 4 which serves to electrically interconnect the anodic plates, maintain proper separation between electrodes of opposite polarity and maintain the relative alignment of the plates. The cathodic plates 10 are similarly welded to a cathode bus bar 12 performing a similar function. The anode 2 and cathode 10 must be constructed so as to be capable of carrying an electrical potential of between about 1 eV and about 24 eV. When in use, the cell is placed on a non-conductive pedestal 14 which directs the solution flow through the cell and provides stability to the cell. Arrows 28 indicate the direction of flow of the solution to be treated. In the preferred embodiment, superior results have been achieved using pressure at least 10 psi, at 10 eV, and utilizing electrode plate thickness 15 of ⅛" or 3.18 mm. and an electrode spacing forming a fluid conduit, fluid pathway or reaction zone 13 with a width of 0.18" or 4.5 mm. as shown in FIG. 3. The space between the electrodes may be referred to alternatively as a fluid pathway, fluid conduit or reaction zone.

Figure 2:
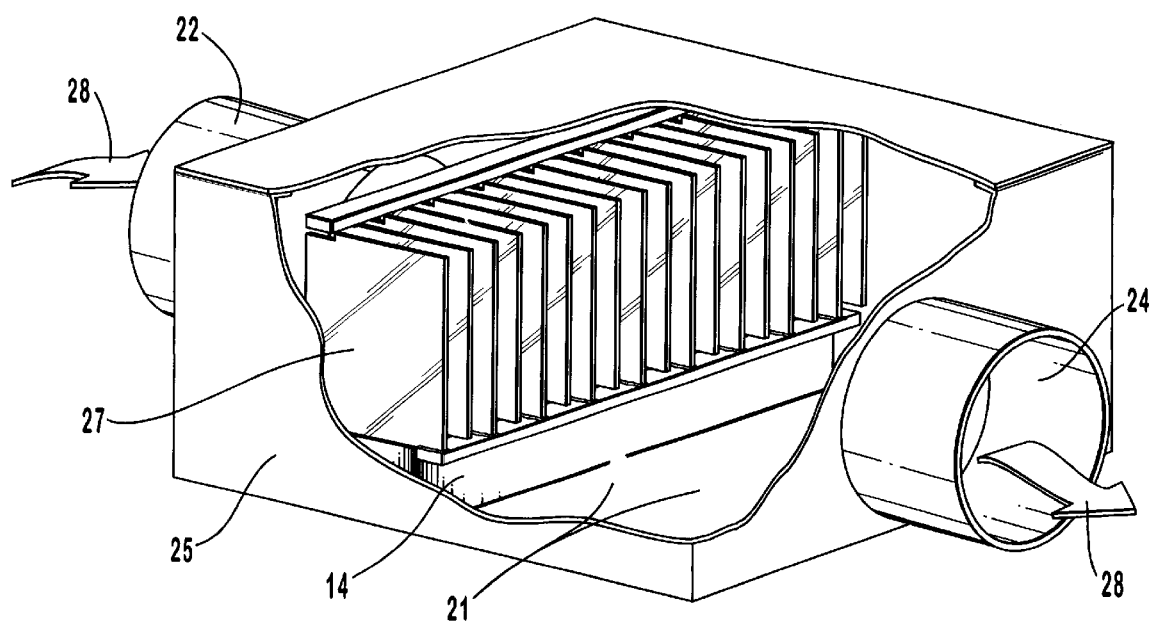
FIG. 2 shows a cutaway view of the preferred embodiment of the typical continuous flow electrolytic cell as it may be used to treat a flowing solution.
Figure 3:
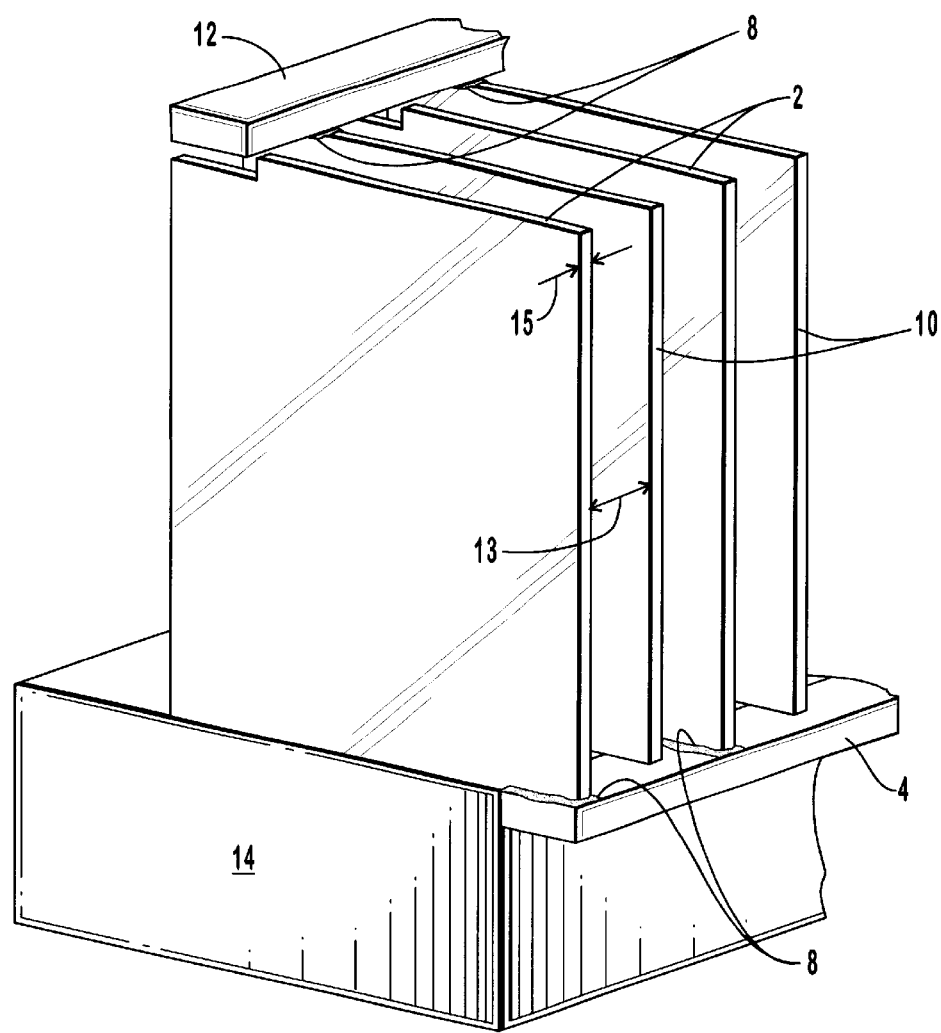
FIG. 3 is a more detailed perspective view of the preferred embodiment of the continuous flow electrolytic cell.
Figure 4:
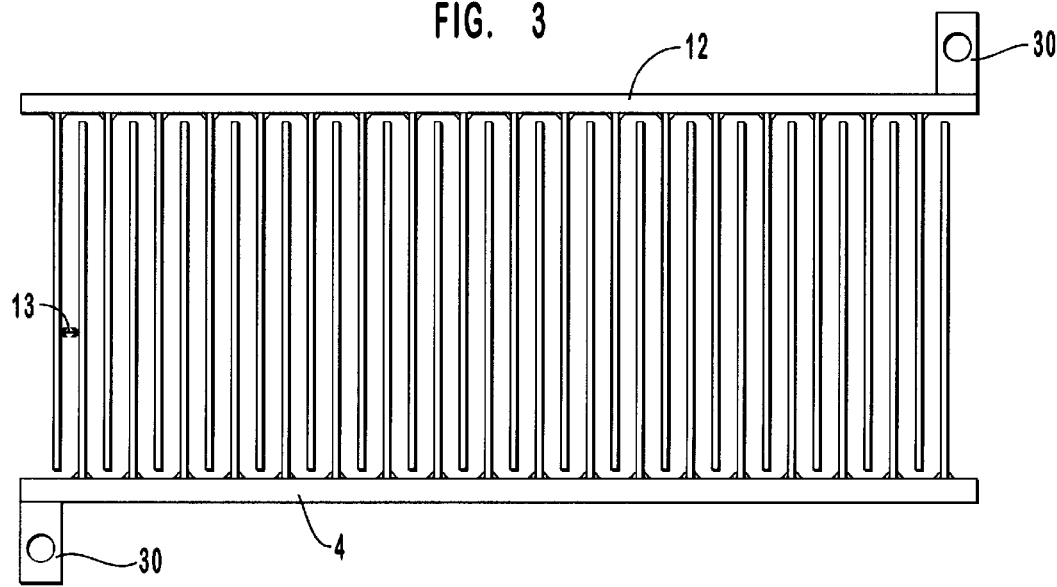
FIG. 4 is a front view of the preferred embodiment of the continuous flow electrolytic cell.
Figure 6:
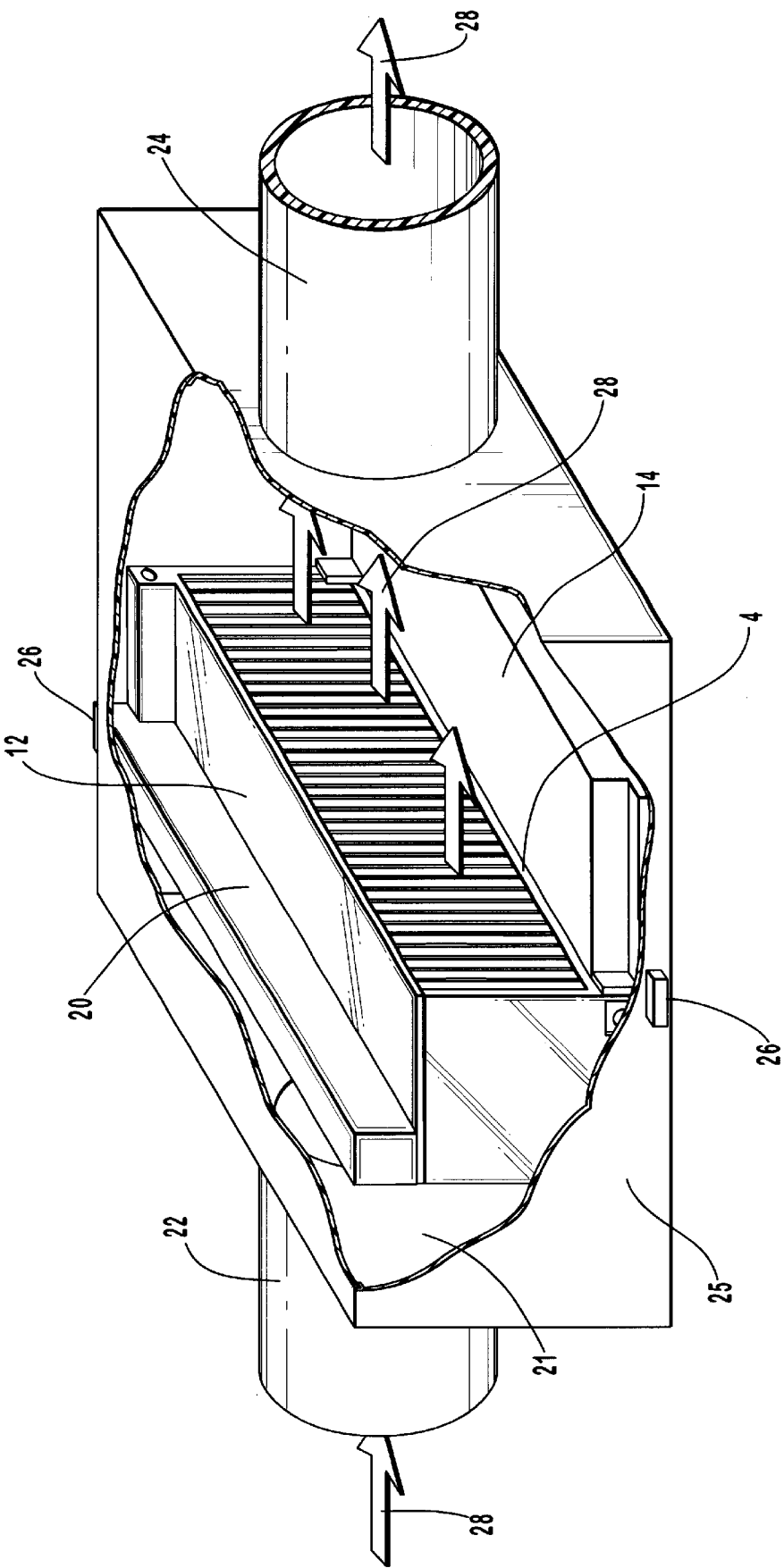
FIG. 6 shows a cut-away view of alternative embodiment "A" of the continuous flow electrolytic cell as it may be used to treat a flowing solution.

FIG. 2 demonstrates the use of a continuous flow cell in which the solution flow 28 is directed from inlet pipe 22 into a cell chamber 21 comprised of a sealable box 25. Box 25 may be constructed of polypropylene, concrete or other suitable material capable of being sealed and capable of maintaining a superambient pressure up to 60 psi under operating conditions. The solution flow is directed under pressure through the electrolytic cell by pedestal 14 and a header block 26 such as is shown in FIG. 6. Box 25 and the pedestal 14 and other flow directing elements are best designed to provide a laminar flow through the cell which increases cell efficiency. The solution is treated as it passes through the electrolytic cell or module 27 and the treated solution exits the cell chamber via outlet pipe 24.

Figure 5:
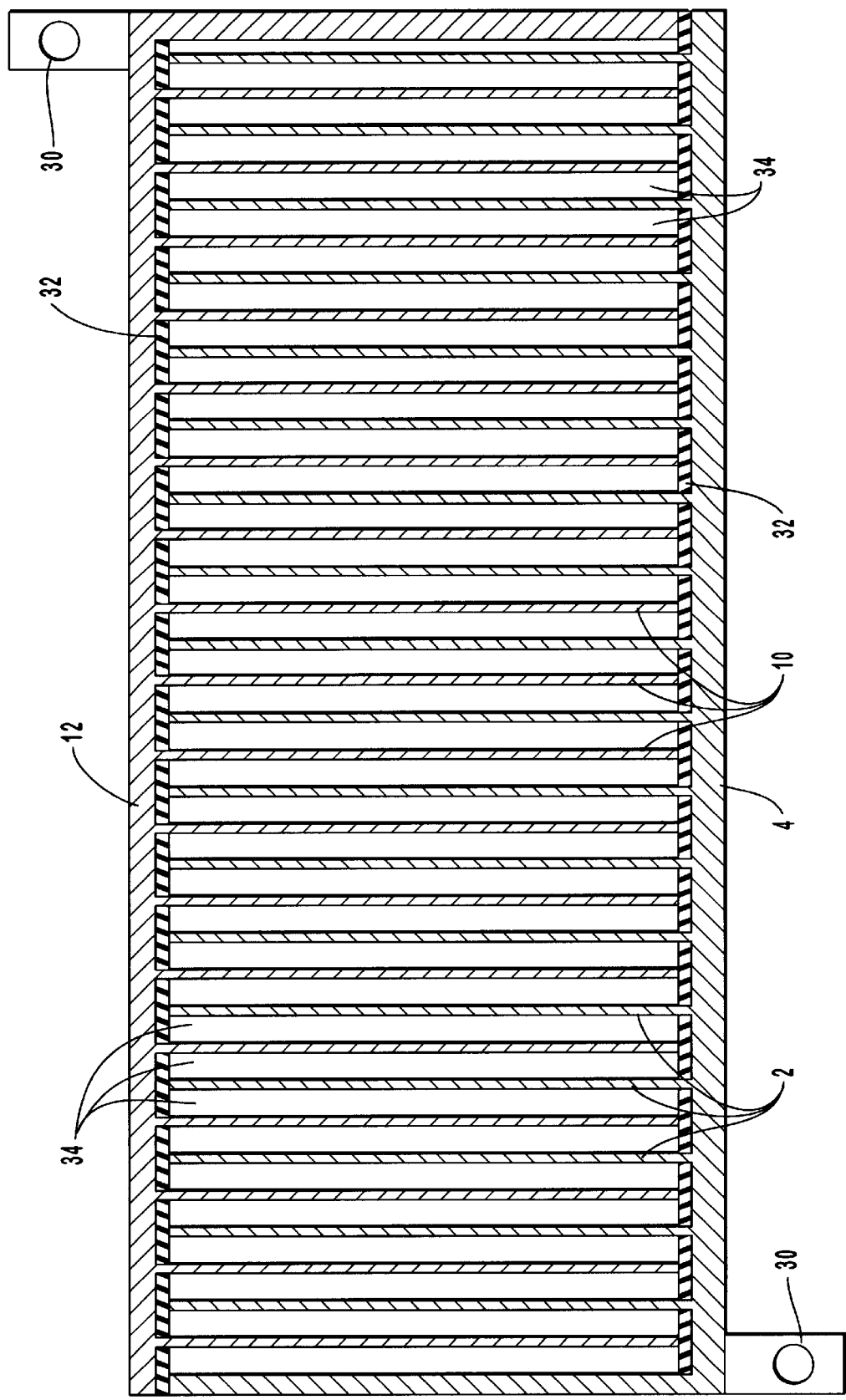
FIG. 5 is a front view of alternative embodiment "A" of the continuous flow electrolytic cell

A slightly different embodiment of the continuous flow cell, alternative embodiment "A", is shown in FIGS. 5 & 6 where bus bars 12 & 4 take the form of plates extending over and under the entire cell. Insulation barriers 32 prevent the cell electrodes from contacting and help form a more fluid tight conduit 34 through the cell module. Bus connection tabs 30 provide a point of connection for the electrodes.

The cell of alternative embodiment "A" is also shown in FIG. 6 where it operates much as explained for the preferred above.

Figure 7:
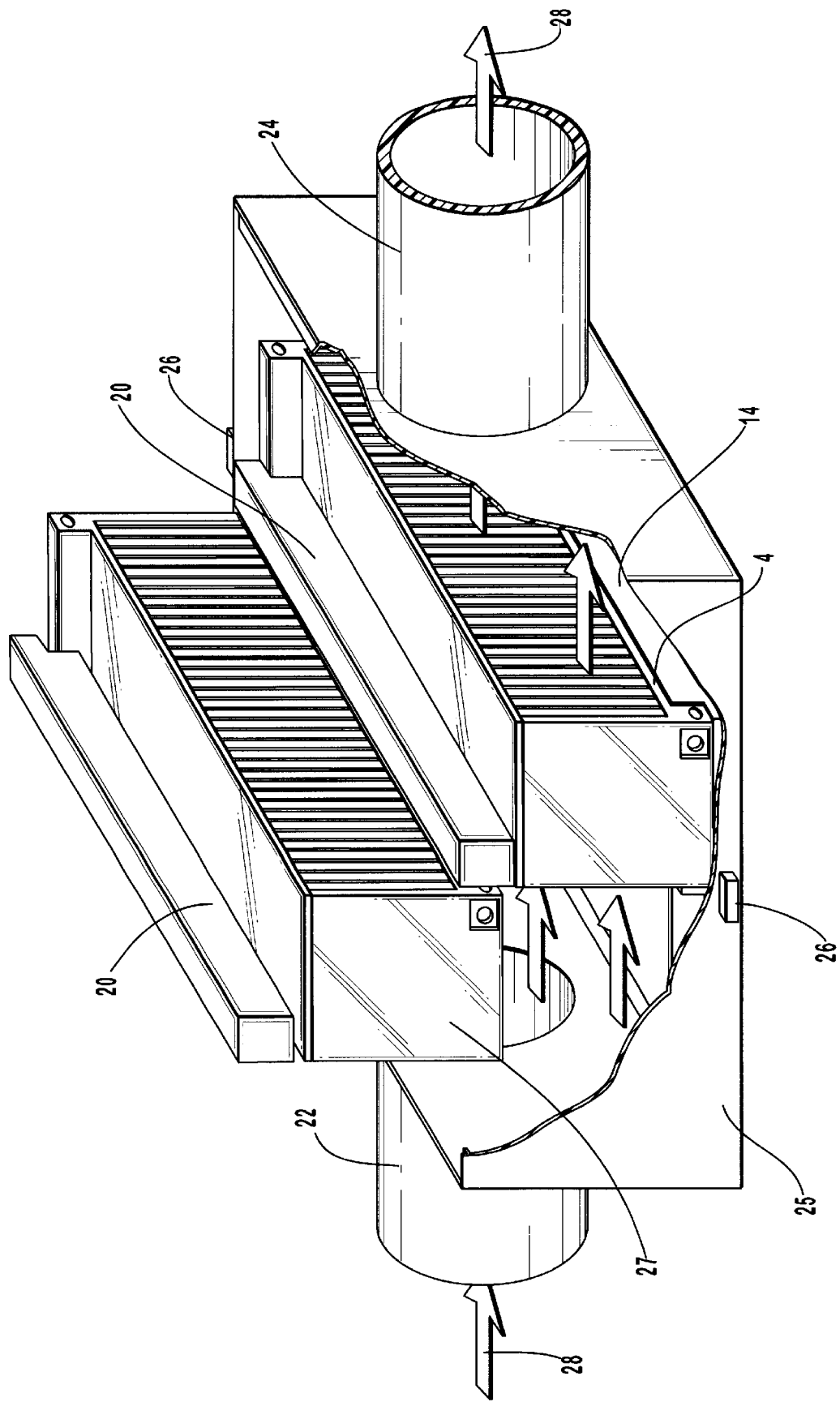
FIG. 7 shows the alternative embodiment "A" of the continuous flow electrolytic cell in an application using dual or alternative cells.

In either of the above described embodiments, the anode/cathode pairs may be constructed in modular units that can be quickly and easily replaced. FIG. 7 shows how a cell module 27 can be exchanged at ambient pressure without interrupting the fluid flow as a replacement module is placed in series with another spent module that will then be removed. These modules or cells may also be used in series to increase contaminant precipitation or increase solution flow rate while maintaining contaminant removal rates.

Figure 9:
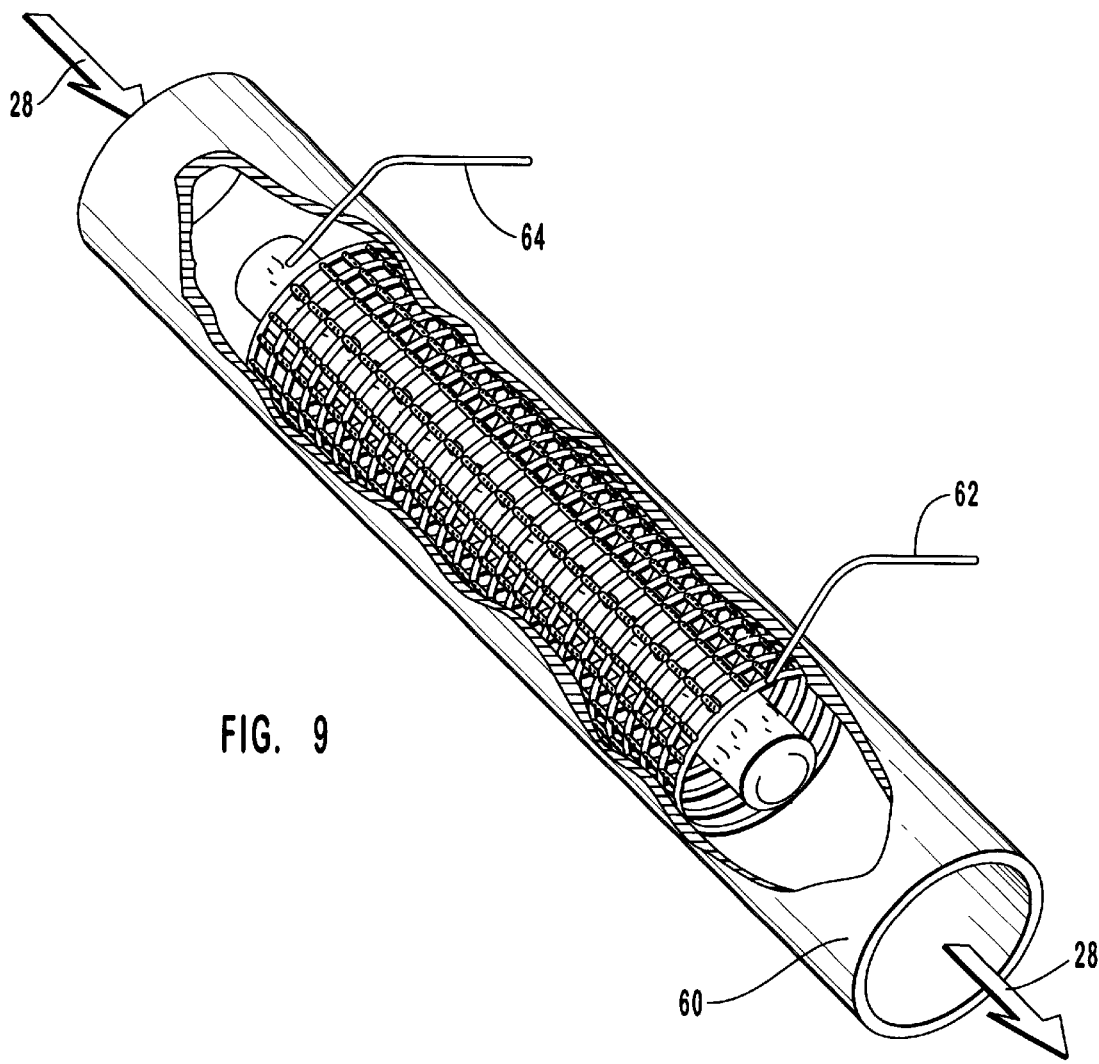
FIG. 9 shows alternative embodiment "B" of the continuous flow electrolytic cell apparatus as it may be used in a typical pipe.

Another embodiment of the continuous flow apparatus is shown in FIG. 9 in which a cell is formed in a pipe of circular cross section. The cathode 64 cooperates with a rod running longitudinally at the center of the pipe 60 while the anode 62 cooperates with a metal screen around the cathode and in contact with the inner surface of the pipe.

Figure 10:
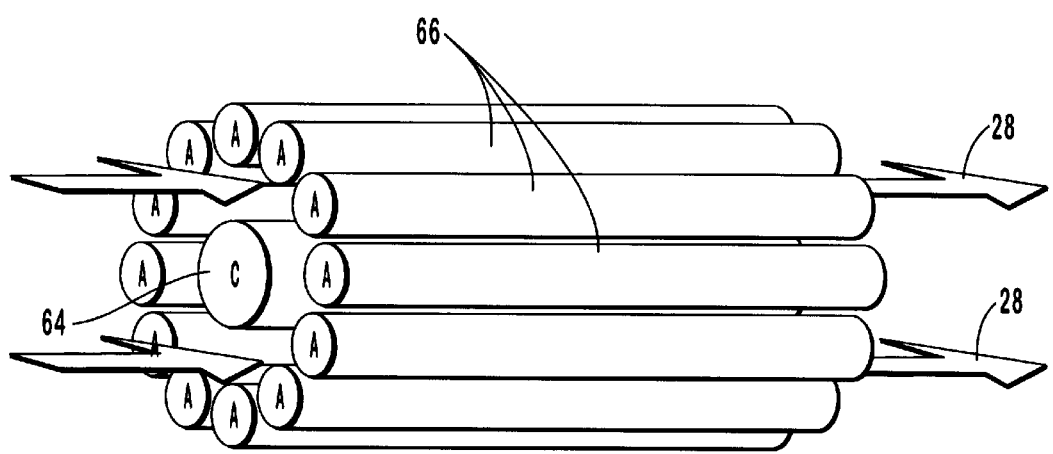
FIG. 10 shows alternative embodiment "C" of the continuous flow electrolytic cell apparatus wherein a singular rod-shaped cathode is surrounded by a plurality of rod-shaped anodes with solution flow along the longitudinal axis of the rods.
Figure 11:
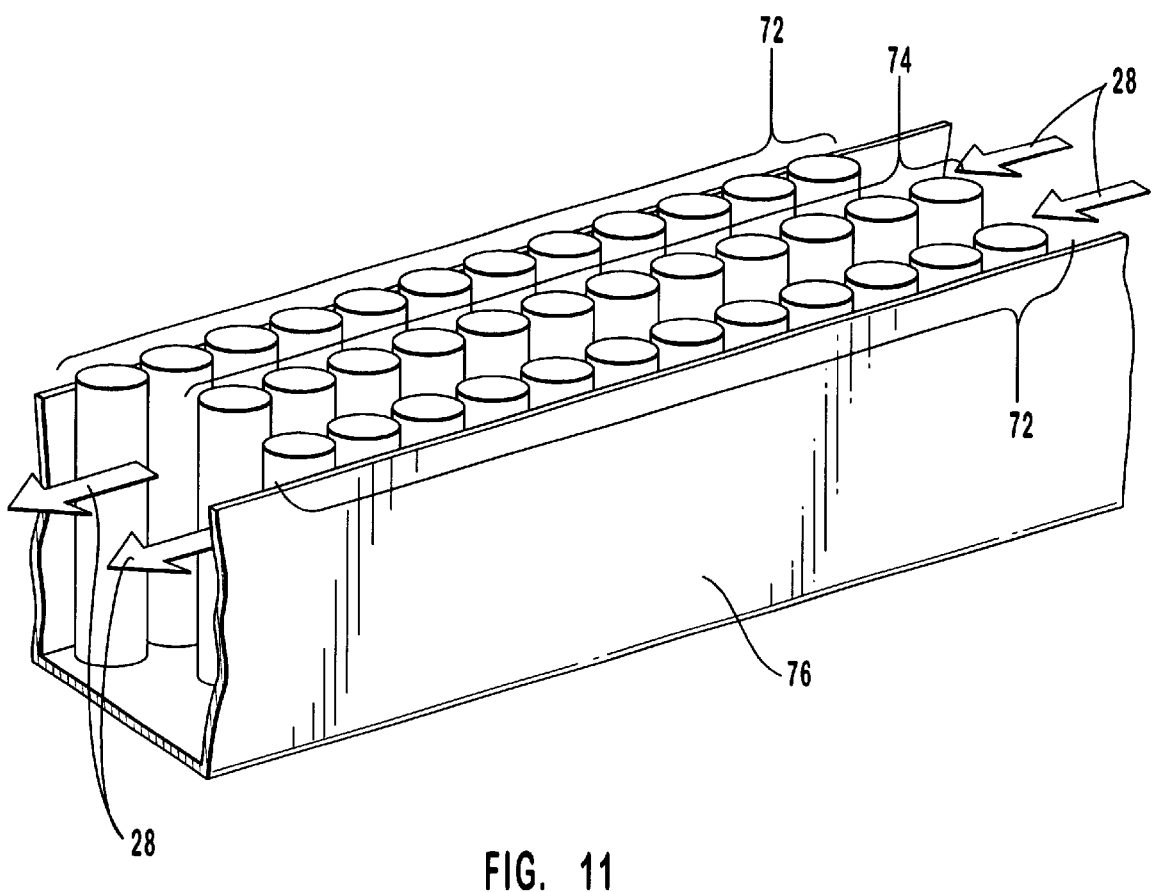
FIG. 11 shows alternative embodiment "D" of the continuous flow electrolytic cell wherein a central row of vertically oriented rod-shaped cathodes is flanked on either side by similar rows of anodes with spaces between the rows to allow solution flow between the anodes and cathodes.

Other electrolytic cell configurations have also proven effective. FIG. 10 depicts a rod-shaped cathode 64 surrounded by rod-shaped anodes 66 with the solution to be treated flowing along the axis of the electrodes. FIG. 11 shows another alternative embodiment where the solution flows along a trough or channel 76 in which alternating rows of vertically-oriented rod-shaped cathodes 74 and anodes 72 are placed.

In one preferred embodiment without increased pressure, temperature or electrical potential, for a flow rate of 100 gallons per minute, the overall dimensions of the electrolytic cell or module are as follows: height of about 4 inches and length in the direction of solution flow of about 4 inches and a width or face perpendicular to the flow direction of about 10 inches. Using a DC electrical potential of 10 volts and a DC current of 20 amps, this configuration efficiently treats a flow of about 50 gallons per minute by taking the arsenic level from 50 ppb to levels less than detection limits. The dimensions of cell or module 27 may be increased or decreased to accommodate higher or lower flow rates. However, increased length in the direction of solution flow has not been found to increase treatment efficiency significantly. A taller or wider cell best accommodates higher flow rates.

The treatment method of the present invention may be performed using any of the above apparatus or other variations depending on the needs or limitations of the user. The batch process, described below, is typically more suitable for experimentation and analysis such as the speciation process while the flow-through cell is more suitable for continuous treatment of water supplies or other fluid flow conditions.

BATCH-METHOD APPARATUS

When the speciation method is desired, as described below, a batch process is employed in which a modified conventional static electrolytic cell is used. The batch process may also be used where a static or constant fluid quantity is desired to be treated.

Figure 8:
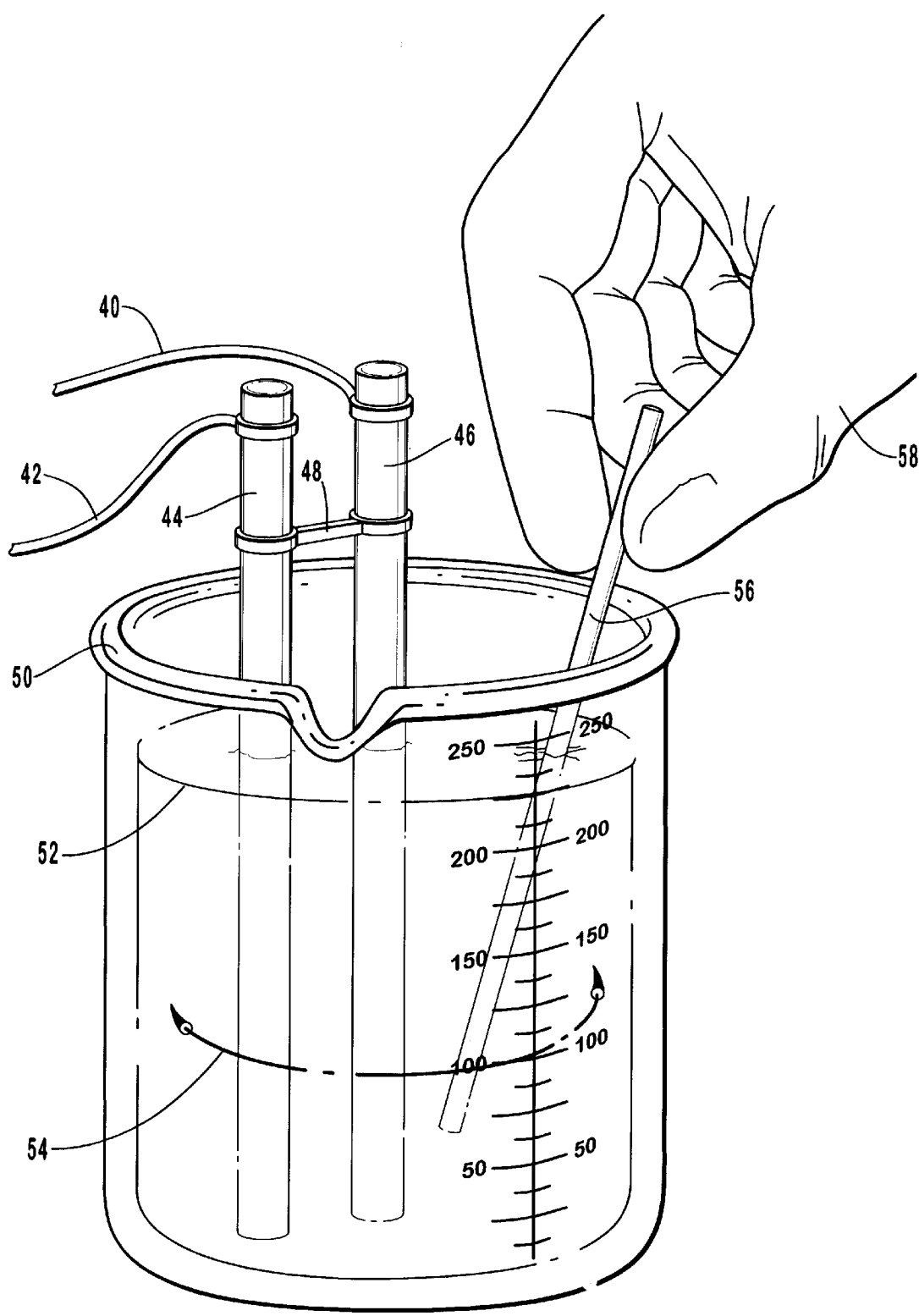
FIG. 8 shows the apparatus of the batch process as it is used to perform the speciation method.

The modified apparatus may be described in reference to FIG. 8 and is comprised of a container, such as a 250 mL beaker 50, which works well for the speciation method when used for potable water samples, or a barrel or vat for larger quantities, into which the solution to be treated 52 is placed. An anode 46 and cathode 44 are then placed in the solution and positioned by a spacer 48 or similar device that will hold them in close proximity while maintaining a fluid pathway, fluid conduit or reaction zone between them. Under the selected pressure and voltage potential, the voltage potential or electron moving force is connected via conventional wiring 40, 42 and activated between the anode and the cathode which voltage potential can provide the required work to create the desired anions, cations, hydroxyls or adions as the method requires, as discussed hereafter. The anode 46 and cathode 44 may take the shape of a plate, rod, bar, screen or other configuration so long as a sufficient electrical potential can be maintained to create the desired ionic species. In the preferred embodiment for the speciation method, slender aluminum rods 44 are used for the anode while the cathode is composed of a transition metal, post-transition metal or graphite. The anode and cathode are placed about 4.5mm apart and sufficient voltage potential is supplied to generate $Al^{+3}$ adions. The solution is typically agitated as shown by arrow 54 with a glass stirring rod 56 by hand 58, but may be agitated using mechanical means. For a 250 mL sample of potable water agitation generally takes two to three minutes, but must continue until the $Al^{+3}$ adions have completely reacted with the dissolved arsenate to form aluminum arsenate, a precipitate. The residual dissolved arsenic of the treated solution will represent the indigenous arsenic (III) species. Therefore, differentiation and quantification of dissolved inorganic species can be resolved.

PROCESSES

When a working iron electrode is immersed into a solution there is a surface charge and the iron electrode adsorbs ions at its surface, either by specific adsorption (the formation of ionsurface bonds-adions) or by electrostatic attraction. The layer of ions at the surface induces a layer of opposite charge in the metal atoms on the iron electrode. The two layers form, in effect, a capacitor known as the adsorbed double layer, or the Hemholtz double layer. To maintain electro-neutrality, the adsorbed layer is surrounded on the solution side by a layer of counterions. This results in a potential across each double layer due to the separation of charges. The overall potential is the sum of the double-layer potentials. One skilled in the art will recognize that the structure and potential of a particular configuration of employing a particular metal or alloy will depend upon the metal-ion combination and the concentrations of dissolved ionic species within the bulk solution and their inherent activities.

When an aqueous solution is being treated to remove anions or transition metal or post-transition metal cations employing the present invention, the anode is composed of a transition metal or a post-transition metal and the cathode is composed of a transition metal, a post-transition metal or a chemically inert electro-conductive material such as graphite. This electrode configuration will allow for the production of completely oxidized adions at the anode which will react directly with the targeted anionic species to form insoluble precipitates. This electrode configuration also provides for the production of hydroxyls at the cathode which hydroxyls will react with some cations to form precipitates. Furthermore, the production of elemental oxygen at the anode which will increase the concentration of dissolved oxygen in the solution which will, in turn, accelerate the reaction velocities of kinetically favorable oxidation reactions of solubilized chemical compounds.

The reactions occurring at the anode may be illustrated using the example of a solution contaminated with arsenic being treated with an iron anode. Similar reactions will occur for other contaminants and anode compositions.

Under ambient conditions, solutions containing arsenic are treated with an iron anode. In doing so, and upon the application of sufficient voltage potential, two chemical reactions occur leading to precipitation of arsenic. The first and most direct reaction is the generation of and simple complexation of iron III cations with the completely oxidized complex anions of arsenic. The resulting anodic product being insoluble iron III arsenate:

$$Fe^{+3}+AsO_4^{-3}=FeAsO_4 \text{ (solid)}$$

The second and more complex chemical pathway involves oxidation of $As^{+3}$ to $As^{+5}$ via oxidation by the anodic emitted $Fe^{+3}$ cations. Followed by the simple complexation chemical pathway involving additional $Fe^{+3}$ cations to produce the anodic product of iron III arsenate:

$$2Fe^{+3}+AsO_3^{-3}+H_2O=2Fe^{+2}+AsO_4^{-3}+2H_3O^+$$

$$AsO_4^{-3}+Fe^{+3}=FeAsO_4(\text{solid})+3H^+$$

While these reactions are occurring, the anode is producing elemental oxygen which increases the dissolved elemental oxygen concentration thereby increasing the reaction velocities of kinetically favorable oxidation reactions. This oxygen is formed via the decomposition of water molecules at the anode as follows:

$$2H_2O \leftrightarrows O_2(g)+4H^++4e^-$$

Hydroxyl ions form at the cathode and are instantly repelled from it and attracted toward the anode. The hydroxyl ions form according to the following equation:

$$2H_2O+2e^- \leftrightarrows H_2(\text{gas})+2OH^-$$

One example of these resulting oxidation reactions is the further oxidation of transition or post-transition metal ions or complex anions which have not yet been fully oxidized as illustrated in the following equation:

$$O_2+Me^{+x} \leftrightarrows Me^{+x+1}$$

OR $$\tfrac{1}{2}O_2+MeO_x^{-x} \leftrightarrows MeO_{x+1}^{-x}$$

where Me is a transition, post-transition or alkaline metal and X is a numerical variable.

This oxidation can significantly contribute to treatment results by precipitating out unwanted compounds. For example, in the treatment of potable water to remove arsenic or other primary contaminants, the oxygen produced at the anode can react with dissolved iron in the water to effectuate its precipitation and further improve the water quality. Iron present in the water as soluble iron II hydroxide can be oxidized to insoluble iron III hydroxide according to the following equation:

$$2Fe(OH)_2 \text{ (soluble)} + \tfrac{1}{2}O_2 + H_2O \leftrightarrows 2Fe(OH)_3 \text{ (insoluble)}$$

This oxidation reaction will lower chlorine costs and improve the taste and odor of potable water.

In addition to producing elemental oxygen at the anode, the hydroxyl ions produced at the cathode may react directly with the dissolved alkaline, transition or post-transition metals to form precipitates. This occurs when in-migrating cations react with the out-migrating hydroxyls of the cathode as illustrated in the following equation:

$$Me^{+x} + XOH^- \leftrightarrows MeO \text{ (solid)} + XH^+ \text{ or } Me(OH)_x \text{ (solid)}$$

where Me is a transition, post-transition or alkaline metal and X is a numerical variable.

As an example of this concept, the following cations have been successfully precipitated with the apparatus of the present invention: $Zn^{+2}$, $Cd^{+2}$, $Pb^{+2}$, $Cu^{+2}$, $Ti^{+2}$, $V^{+2}$, $Be^{+2}$, $Pb^{+4}$ and $Ti^{+4}$. These above described reactions are thought to contribute to the overall effectiveness and efficiency of the present invention, however other reactions and forces may be involved.

However, under conditions of increased pressure and voltage potential, the desired simple complexation of iron III cations with the completely oxidized complex anions of arsenic becomes the dominant reaction thereby augmenting the direct production of insoluble iron III arsenate:

$$Fe^{+3} + AsO_4^{-3} = FeAsO_4 \text{(solid)}$$

This appears to occur for several reasons.

When the electrical potential is changed, the rate of reaction changes. The cell potential for results utilizing the present invention range from about 1 eV to about 24 eV. When the electrical potential of the electrolytic cell is increased above the normally sufficient ionization energy level for iron, the production of iron III dominates over the production of iron II ions.

Simultaneous to the reactions discussed above, anodic half-cell reactions are occurring, including:

$$2H_2O \leftrightarrow O_2 + 4H^+ + 4e^- \quad E = -1.23 \text{ eV (``HC1'')}$$
$$4OH^- \leftrightarrow O_2 + 2H_2O + 4e^- \quad E = -0.4 \text{ eV (``HC2'')}$$
$$3OH^- \leftrightarrow HO_2^- + H_2O + 2e^- \quad E = -.87 \text{ eV (``HC3'')}$$

Under ambient or subambient conditions HC1 is the dominant half-cell reaction. The water molecules compete or interfere with in-migrating arsenic ions for reaction with the out-migrating iron ions. However, it has been discovered that when the pressure of the system reaches at least 10 psi, the HC2 and HC3 half-cell reactions become the dominant half-cell reactions. This is believed to occur because more ordered and closely arranged water molecules do not migrate as quickly to the anode surface. Conversely and simultaneously, ionic species become less ordered and more rapidly migrate to the surface of the anode. Additionally, with less electrons being discharged by the water molecules at the surface of the anode, the generated iron III adions will less likely be reduced to iron II adions. With an abundance or greater presence of iron III adions at the surface of the anode, greater concentrations of iron III will be emitted into the inner-acid layer of the anodic Hemholtz double layer. The availability of more iron III ions presents an enhanced opportunity for reaction with in-migrating contaminant anions in solution.

Anions have varying migration velocities. For example, the following illustrates some ions typically found in water at ambient conditions, the ions order from left to right in the order of decreasing migration speed (the left-most having the fastest migration velocity and the right-most having the slowest):

$$SO_4^{-2} > AsO_4^{-3} > HAsO_4^{-2} > AsO_3^{-3} > HAsO_3^{-2} > H_2AsO_3^- > OH^- > Cl^-$$

Testing of fast flowing aqueous solutions through a pressurized system has shown that the slowing of migration velocities of arsenates and arsenites is negligible.

Under the pressurized system, the completely oxidized complex anions of arsenate more readily and rapidly enter the inner-acid layer of the anodic Hemholtz double layer to react with the higher concentration of iron III to form insoluble precipitate:

$$Fe^{+3} + AsO_4^{-3} = FeAsO_4 \text{ (solid)}$$

This reaction becomes the dominant reaction. The previously mentioned second and more complex chemical pathway involving oxidation of $As^{+3}$ to $As^{+5}$ continues to occur but at lower rates.

The flow rate also effects the reaction rate. Because the flow of the present invention is convection (between opposing plates) the flow rate must be adjusted to allow the migration velocities of the arsenates and arsenites to overcome the convection energy imparted to them from the flowing solution itself. This is accomplished by regulating pumping rates via valve controls or adjustments on flow gates etc.

If the composition of the anode is further restricted to the group consisting of iron, aluminum and manganese and their respective alloys, the electrolytic cell will generate $Fe^{+3}$, $Al^{+3}$ or $Mn^{+4}$ respectively which will react with discharging water molecules to form iron III hydroxide, aluminum hydroxide or manganese dioxide respectively which can be used as filter media or adsorption media for removal of various ionic species.

SPECIATION

Arsenic can be present in a solution in several forms. It can be in particulate form, a trivalent ionic state and/or a pentavalent ionic state. These states dictate whether the arsenic is in an insoluble particulate form or in a soluble form. When treating an aqueous solution containing arsenic it is often desirable to know the amount of arsenic present in each state so that appropriate treatment methods are applied. The speciation method of the present invention will determine these amounts. The speciation method utilizes the batch method apparatus as described above. In this process the anode must be constructed of aluminum and the cathode may be constructed of a transition metal, post-transition metal or graphite.

The process is begun by analyzing a sample of the solution to determine the total amount of arsenic present in the solution in all forms. The sample is then filtered to remove any particulates above 0.45 microns. This filtration will remove any arsenic in a particulate form leaving only ionic forms of arsenic. The total amount of arsenic in the solution is now measured again and subtracted from the total measured before filtration. The difference represents the amount of particulate arsenic which is present. The solution sample is now placed in contact with the electrolytic cell apparatus of the batch method using aluminum electrodes while sufficient voltage is applied to create enough work to oxidize the surface aluminum atoms of the anode thereby creating an adsorbed layer of $Al^{+3}$ ions on the surface of the anode that reacts with $As^{+5}$ dissolved in the solution in the form of arsenate, $AsO_4^{-3}$ ions thereby forming aluminum arsenate, but without complexing with the dissolved $As^{+3}$ ions in the form of arsenite.

While in contact with the electrodes, the solution is agitated continuously to cause the solution to repeatedly pass between the electrodes and fully precipitate $As^{+5}$ from the solution. When this process is performed for concentrations typical to potable water samples, this step can be completed in 2 to 3 minutes. For solutions with higher arsenic concentration, diffusion rate problems arise as the precipitates adhere to the electrodes making this process problematic. Some minor experimentation may be required to determine how long this treatment step should take. While treating a new solution sample, specimens may be taken from the solution at sequential time intervals which can then be tested to determine the point at which arsenic removal is maximized.

After electrolysis, the solution is again filtered to remove particles above 0.45 microns in size leaving only the $As^{+3}$ in the solution. The solution is again analyzed to determine the total amount of arsenic present, which now reveals the amount of $As^{+3}$ originally in the solution. The various amounts of other arsenic forms can then be determined by simple subtraction.

ANTI-FOULING PROCESS

In the course of using the electrolytic cell of the present invention, the electrodes will often become fouled by the buildup of precipitates on the surfaces of the electrodes. As the precipitates build up on the surfaces of the electrodes the cell efficiency is reduced. This buildup can often be removed simply by reversing the polarity of the electrodes thereby causing the precipitates to sluff off of the electrodes and be carried away to the subsequent filtration or settling phase of the treatment operation. This occurs because the diffusion layers alternate between acidic and basic conditions resulting in an expulsion condition for the buildup. This polarity switching may be performed manually or automatically by switching the DC polarity of the cell. It may also be performed automatically by using an AC current to power the cell.

If an AC current is used, the frequency must be low enough to allow ionic migration within the cell. If the frequency is too high, ions will migrate back and forth oscillating between the electrodes without entering the diffusion layer where they will react to form precipitates. Due to the inherent complications with the AC polarity switching, the DC switching is believed to be the best mode of electrode anti-fouling. Tests using a 4"×4"×10" iron plates have shown that hourly polarity switching is sufficient to maintain the cell's efficiency. It should be noted that if the polarity is to be switched, the anode and cathode must be composed of the same material to maintain consistent precipitation results in both polarity configurations.

These and other advantages are apparent from the forgoing description. The forgoing examples are illustrative only. The scope of the present invention is better revealed by the following claims.

What is claimed is:

1. A water treatment method for electrolytically precipitating ionic arsenic contaminants from aqueous solutions comprising:

constructing a sealed electrolytic cell with an iron anode and a cathode structured to form a fluid pathway there between through which the contaminated aqueous solutions pass, the sealed electrolytic cell capable of containing at least 10 psi of system pressure, and applying at least 10 psi of pressure to the electrolytic cell, applying a sufficient voltage between the anode and cathode to provide the required work to create adions on the surface of the anode to directly cause the formation of ferric arsenate precipitate to thereby insolubilize the arsenic ions in the contaminated aqueous solutions.

2. The water treatment method of claim 1, wherein said voltage between the anode and cathode is a least 10 eV.

3. A method for precipitating anions from an aqueous solution comprising:

constructing an electrolytic cell with at least one anode composed of a transition metal or a post transition metal; and at least one cathode positioned adjacently to said at least one anode so as to form a fluid pathway between said at least one anode and said at least one cathode through which an aqueous solution may pass, the sealed electrolytic cell capable of containing at least 10 psi of system pressure, applying at least 10 psi of pressure to the electrolytic cell, and passing an aqueous solution through said fluid pathway while applying a sufficient voltage between said at least one anode and said at least one cathode to create completely oxidized adions on the surface of the anode to directly cause the formation of at least one precipitate in the aqueous solution.

4. The method of claim 3 wherein said at least one cathode and said at least one anode have plate-like shapes, in a substantially parallel configuration, defining said fluid pathway.

5. The method of claim 4 wherein said plate-like shaped electrodes are spaced approximately 4.5 millimeters apart.

6. The method of claim 4 wherein said plate-like shaped electrodes are approximately ⅛ inch in thickness.

7. The method of claim 3 wherein said voltage is at least 10 eV.

8. The method of claim 3 wherein said passing an aqueous solution is a substantially continuous flow of said solution between said at least one anode and said at least one cathode.

9. The method of claim 3 wherein said cathode is comprised of a material selected from the group consisting of transition metals, post-transition metals or graphite.

10. The method of claim 3 wherein said anode is comprised of a material selected from the group consisting of Copper, iron, aluminum, lead, zinc, tin, manganese, nickel, silver, or cobalt.

11. The method of claim 3 wherein said precipitate comprises one or more adions and one or more anions which combine within the diffusion layer of the anode.

12. The method of claim 11 wherein said anions may be selected from the group consisting of $TiO_3^{-2}$, $VO_3^{-2}$, $MoO_4^{-2}$, $SbO_4^{-3}$, $ASO_4^{31\ 3}$, $AsO_3^{-3}$, $SeO_4^{-2}$, $SeO_3^{31\ 2}$, $S^{-2}$, and $PO_4^{-3}$.

13. A method for precipitating transition and post-transition metal cations from an aqueous solution comprising:

constructing an electrolytic cell with at least one anode composed of a transition metal or a post-transition metal; and at least one cathode positioned adjacently to said at least one anode so as to form a fluid pathway between said at least one anode and said at least one cathode through which an aqueous solution may pass, the electrolytic cell capable of containing at least 10 psi of system pressure, applying at least 10 psi of pressure to the electrolytic cell, and applying a sufficient voltage between said at least one anode and said at least one cathode to create hydroxyls on the surface of the cathode to directly cause the formation of at least one precipitate in the aqueous solution.

14. The method of claim 13 wherein said voltage is at least 10 eV.

15. The method of claim 13 wherein said one precipitate is formed by a cation and one or more hydroxyls reacting within the diffision layer of the cathode, and wherein the cation is found in the group consisting of $Zn^{+2}$, $Cd^{+2}$, $Pb^{+2}$, $Cu^{+2}$, $Ti^{+2}$, $V^{+2}$, $Be^{+2}$, $Pb^{+4}$ and $Ti^{+4}$.

16. A method for precipitating anions and transition and post-transition metal cations from an aqueous solution comprising:

constructing an electrolytic cell with one or more anodes composed of a transition metal or a post-transition metal; and one or more cathodes composed of a transition metal, a post-transition metal or graphite positioned adjacently to said one or more anodes, said one or more anodes and said one or more cathodes defining a fluid pathway therebetween and being in fluid contact with an aqueous solution, the electrolytic cell capable of containing at least 10 psi of pressure, applying at least 10 psi of pressure to the electrolytic cell, and applying a sufficient voltage between said one or more anodes and said one or more cathodes to create hydroxyls on the surface of the cathode and completely oxidized adions on the surface of the anode to directly cause the formation of one or more precipitates in the aqueous solution.

17. The method of claim 16 further comprising:

passing an aqueous solution through said fluid pathway, the applied pressure thereby decreasing the random movement of the water molecule causing order and strengthened bonds between the water molecules and thereby decreasing the distances between associated water molecules, wherein the applied pressure inhibits anodic $H^+$ generating half-cell reaction by discouraging the decomposition of water molecules which discharge electrons into the surface of the anode and which create additional acid within the acid-layer thereby minimizing the amount of electrons discharging into the surface of the anode via decomposition of water molecules and collected by out-migrating iron III cations, to increase the reaction between out-migrating iron III cations and in-migrating anions.

18. The method of claim 16 wherein attractive forces between water molecules and ionized constituents is decreased thereby increasing the disorder (random movement) of ionized constituents to increase the migration velocities of ionized constituents as they move towards their respective electrodes so as to enhance the effective collisions between in-migrating alkaline, transition, or post transition metal cations, and hydroxyls within the alkaline layer of the cathodic Hemholtz Double Layer to create alkaline, transition, or post transition metal oxides or hydroxides.

19. A method for generating iron III hydroxide or aluminum hydroxide or manganese dioxide precipitates within an aqueous solution which may be used for filter media for particulate matter removal or adsorption media for removal of dissolved ionic species comprising:

constructing an electrolytic cell with at least one anode composed of a material selected from the group consisting of iron, iron alloy, aluminum, aluminum alloy, manganese and manganese alloy, and at least one cathode composed of an electro-conductive material positioned adjacently to said at least one anode through which an aqueous solution may pass, said at least one anode and said at least one cathode forming a fluid pathway through which an aqueous solution may pass; the electrolytic cell capable of containing at least 10 psi of system pressure, applying at least 10 psi of pressure to the electrolytic cell, and passing an aqueous solution through said fluid pathway while applying a sufficient voltage between said at least one anode and said at least one cathode to create the completely oxidized adions of iron plus three, aluminum plus three or manganese plus four on the surface of the anode to directly cause the formation of iron three hydroxide, aluminum hydroxide or manganese dioxide via reactions with in-migrating hydroxyl ions or waters.

20. A method for removing anions from an aqueous solution comprising:

constructing an electrolytic cell comprising a container for holding a quantity of aqueous solution, at least one anode composed of a transition metal or a post transition metal in contact with said quantity of aqueous solution; and at least one cathode composed of a material selected from the group consisting of transition metals, post transition metals and graphite positioned in close proximity to said anode and in contact with said quantity of aqueous solution, the electrolytic cell capable of containing at least 10 psi of system pressure, and applying at least 10 psi of pressure to the electrolytic cell, and applying a sufficient voltage between said at least one anode and said at least one cathode to create completely oxidized adions on the surface of the anode to directly cause the formation of at least one precipitate in the aqueous solution.

21. The method of claim 20 wherein said anode is composed of aluminum.

22. The method of claim 20 wherein said precipitate is composed of an adion and an in-migrated anion.

23. An electrolytic apparatus for precipitating anions from an aqueous solution comprising:

at least one anode composed of a transition metal or a post-transition metal; and at least one cathode positioned adjacently to said anode so as to form a fluid pathway between said anode and said cathode through which an aqueous solution may pass, an electrolytic cell housing the anode and cathode and capable of containing at least 10 psi of system pressure, and a voltage source between said at least one anode and said at least one cathode of sufficient potential to create completely oxidized adions on the surface of said at least one anode that may directly cause the formation of a precipitate in the aqueous solution, an aqueous solution source capable of flowing through the fluid pathway at at least 10 psi of pressure.

24. An electrolytic apparatus for removing anions from an aqueous solution comprising:

at least one anode composed of a transition metal or a post transition metal; and at least one cathode positioned adjacently to said at least one anode so as to form a fluid pathway between said at least one anode and said at least one cathode through which an aqueous solution may pass, means for creating a sufficient electrical potential between said at least one anode and said at least one cathode to create completely oxidized adions on the surface of said at least one anode that may directly cause the formation of at least one precipitate in the aqueous solution, means for effectuating the flow of an aqueous solution through the fluid pathway at at least 10 psi pressure.

* * * * *